United States Patent
Arrobo Vidal et al.

(10) Patent No.: US 12,238,669 B2
(45) Date of Patent: Feb. 25, 2025

(54) SUPPORTING INFORMATION CENTRIC NETWORKING IN NEXT GENERATION CELLULAR NETWORKS

(71) Applicant: Apple Inc., Cupertino, CA (US)

(72) Inventors: Gabriel Arrobo Vidal, Hillsboro, OR (US); Geng Wu, Portland, OR (US); Qian Li, Beaverton, OR (US); Zongrui Ding, Portland, OR (US); Ching-Yu Liao, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/475,374

(22) Filed: Sep. 27, 2023

(65) Prior Publication Data
US 2024/0031971 A1 Jan. 25, 2024

Related U.S. Application Data

(62) Division of application No. 17/288,837, filed as application No. PCT/US2019/058388 on Oct. 28, 2019, now Pat. No. 11,930,471.

(Continued)

(51) Int. Cl.
*H04W 60/00* (2009.01)
*H04W 48/00* (2009.01)

(52) U.S. Cl.
CPC .......... *H04W 60/00* (2013.01); *H04W 48/17* (2013.01)

(58) Field of Classification Search
CPC ..... H04W 60/00; H04W 48/17; H04W 88/16; H04W 8/06
See application file for complete search history.

(56) References Cited

U.S. PATENT DOCUMENTS

2014/0192717 A1 7/2014 Liu et al.
2016/0100350 A1* 4/2016 Laraqui ................. H04W 60/00
370/328

(Continued)

FOREIGN PATENT DOCUMENTS

CN 104919758 A 9/2015
WO 2015134751 A1 9/2015

(Continued)

OTHER PUBLICATIONS

Nguyen, et al., "Proposal for Standardization of Green Information Centric Networking Based Communication Utilizing Proactive Caching in IntelligentTransport System", Journal of ICT Standardization, vol. 4, Issue. 1, Retrieved from Internet: https://www.riverpublishers.com/journal/journal_articles/RP_Journal_2245-800X_413.pdf, Jul. 2016, 30 pages.

(Continued)

*Primary Examiner* — Mazda Sabouri
(74) *Attorney, Agent, or Firm* — Dorsey & Whitney LLP

(57) ABSTRACT

Technology for an Information Centric Networking gateway (ICN-GW) operable to modify an ICN message received from a user equipment (UE) in a Fifth Generation (5G) cellular network is disclosed. The ICN-GW can decode the ICN message received from the UE via a Next Generation NodeB (gNB) and an ICN point of attachment (ICN-PoA). The ICN-GW can modify the ICN message to produce a modified ICN message. The ICN-GW can encode the modified ICN message to route the modified ICN message to a data network.

17 Claims, 15 Drawing Sheets

Related U.S. Application Data

(60) Provisional application No. 62/755,146, filed on Nov. 2, 2018.

(56) References Cited

U.S. PATENT DOCUMENTS

| | | |
|---|---|---|
| 2016/0212066 A1 | 7/2016 | Ravindran et al. |
| 2017/0237660 A1* | 8/2017 | Trossen ............... H04L 67/568 370/392 |
| 2018/0007177 A1 | 1/2018 | Suthar et al. |
| 2018/0062935 A1 | 3/2018 | Dong et al. |
| 2018/0146071 A1* | 5/2018 | Himayat ............. G06F 16/9574 |
| 2018/0288726 A1 | 10/2018 | Azgin et al. |
| 2019/0124508 A1 | 4/2019 | Watfa et al. |
| 2020/0351634 A1 | 11/2020 | Qi et al. |
| 2020/0367019 A1 | 11/2020 | Wang et al. |

FOREIGN PATENT DOCUMENTS

| | | |
|---|---|---|
| WO | 2017139050 A1 | 8/2017 |
| WO | 2018174021 A1 | 9/2018 |

OTHER PUBLICATIONS

PCT/US2019/058388, International Search Report and Written Opinion, Feb. 11, 2020, 10 pages.

Ravindran, et al., "Enabling ICN in 3GPP's 5G NextGen Core Architecture", Retrieved from the Internet: <URL: https://tools.ietf.org/pdf/draft-ravi-icnrg-5gc-icn-02.pdf>, Jul. 2, 2018, 26 pages.

Samsung Electronics Co., Ltd., "Overview of Multimedia Service use cases and requirements", Tdoc S4-170778, 3GPP TSG SA WG4 Meeting #95, Belgrade, Serbia, Agenda Item 8.8, Nov. 9-13, 2017, 15 pages.

U.S. Appl. No. 18/475,385, Notice of Allowance, May 15, 2024, 12 pages.

U.S. Appl. No. 17/288,837 , Notice of Allowance, Nov. 6, 2023, 13 pages.

Ericsson , "Correction of P-Charging-Vector access-network-charging-info syntax", C1-144766, 3GPP TSG-CT WG1 Meeting #89, San Francisco, California, Change Request 24.229 CR 5125 Rev 2 Current version: 11.13.0, Nov. 17-21, 2014, 7 pages.

Electronic Design Technology, issue 01, News, Jan. 15, 2001, 2 pages.

* cited by examiner

SUPPORTING INFORMATION CENTRIC NETWORKING IN NEXT GENERATION CELLULAR NETWORKS

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
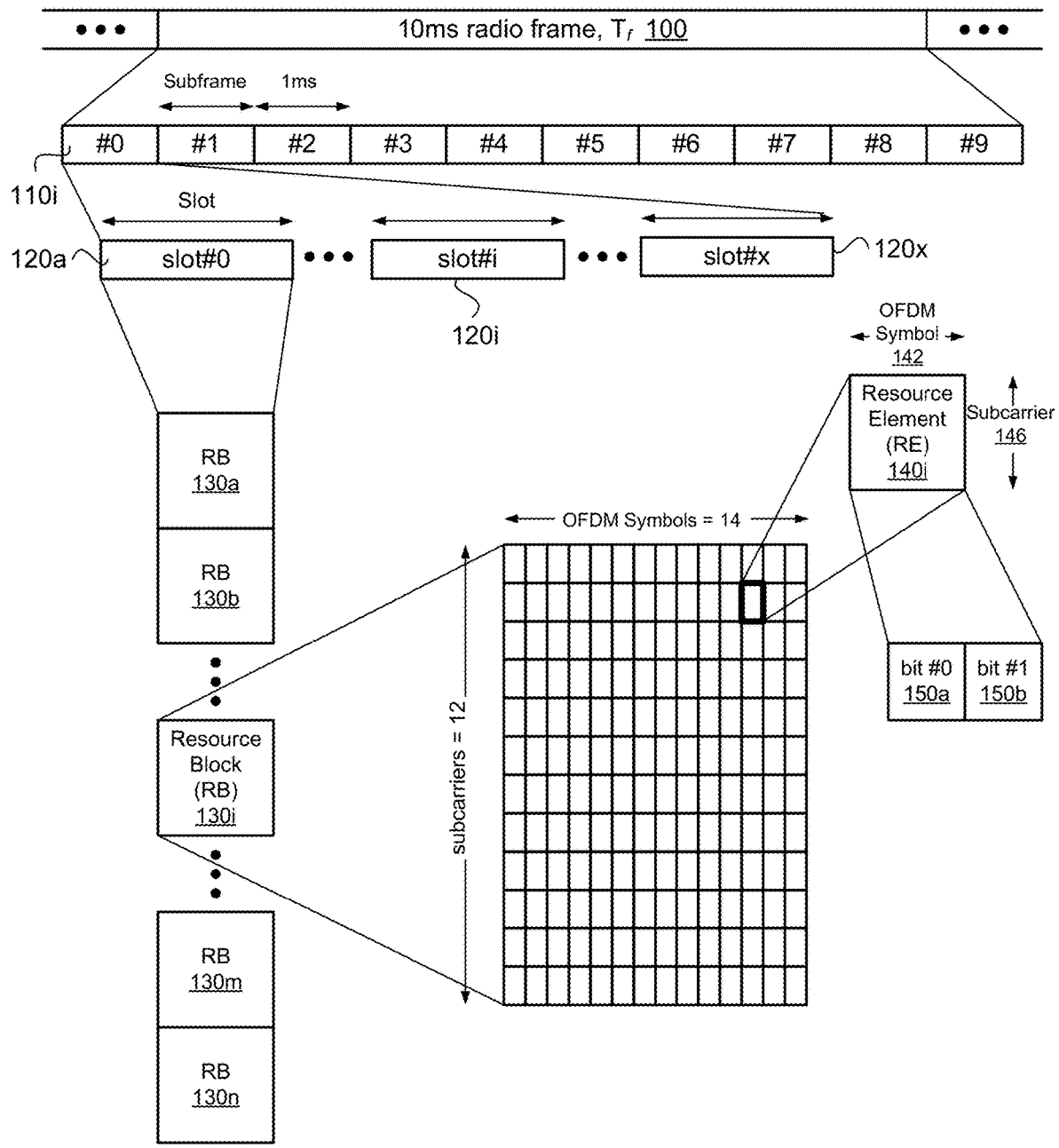
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120*a*, 120*i*, and 120*x*, each with a duration, $T_{slot}$, of 1/µms, where µ=1 for 15 kHz subcarrier spacing, µ=2 for 30 kHz, µ=4 for 60 kHz, µ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130*a*, 130*b*, 130*i*, 130*m*, and 130*n* based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140*i* can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one example, current networking architecture is based on Internet Protocol (IP) and is host-centric. Thus, communication can be host-to-host and content delivery can rely on sessions between two end points. Maintenance of these end-to-end sessions can be complex and error-prone. Additionally, bottlenecks can be created in the network because multiple users might be requesting the same content, but the network can have no knowledge of this, causing a non-optimal utilization of link resources. Moreover, inside the network, content may be unable to be shared among different users requesting the same content.

In one example, high bandwidth video makes a high portion of the internet traffic today and mobile wireless devices account for as high as 61% of the internet traffic. By 2021, content delivery networks (CDNs) are forecasted to carry 71% of the internet traffic. To enable efficient content delivery, the networking community has been making great efforts to redesign the internet architecture to be more flexible and efficient for content caching and redistribution. Such ICN efforts/projects occurring worldwide include named data network (NDN), content centric networking (CCN), among others. Moreover, 3GPP is currently studying approaches to mobility management protocols for potential replacement of general packet radio service (GPRS) tunneling protocol (GTP) tunnels between user plane functions (UPFs) (N9 interface).

In one example, ICN can be used to represent this new concept of content delivery. ICN works in a pull-based model, where two types of packets are defined: interest packets and data packets. ICN is based on a data structure which includes a pending interest table (PIT), forward information base (FIB), and content store (CS). ICN also utilizes interest forwarding strategies which takes input from both FIB and measurements to make interest forwarding decisions. When a node receives an ICN interest packet, the node checks its CS to see whether it already has the content cached. If not, the interest packet can be passed to the PIT to find a matching name. If no match is found, the node can record the interest in its PIT and forward the interest to the next hop(s) towards the requested content based on the information in its FIB.

Figure 2:
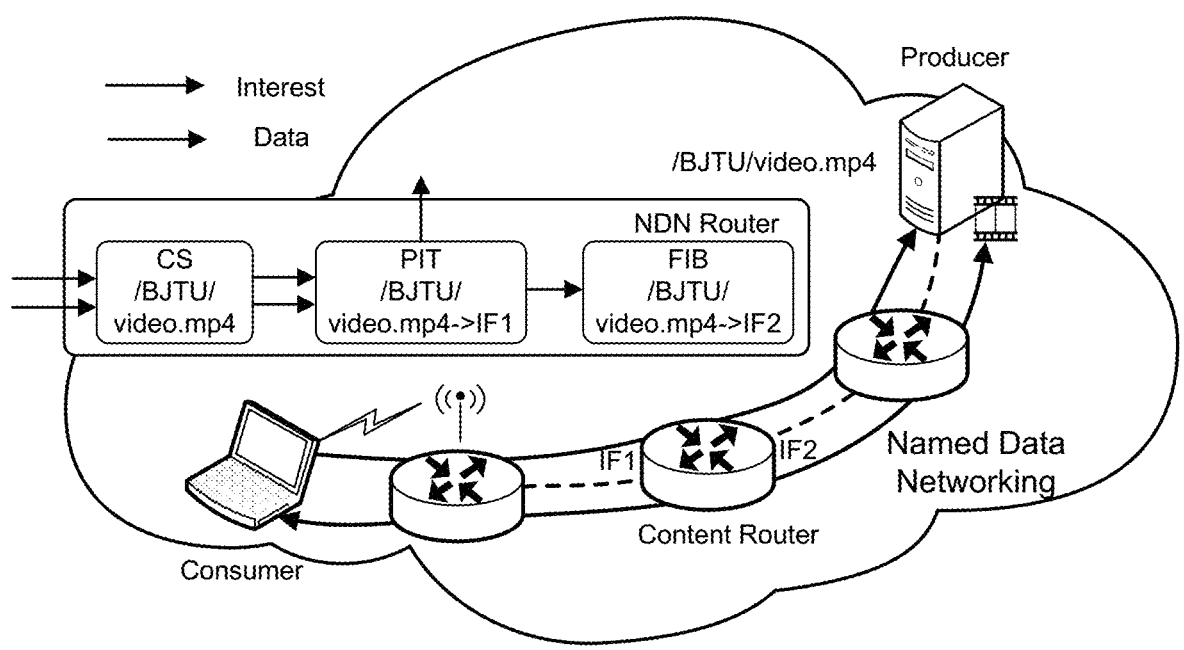
FIG. 2 illustrates an information centric networking (ICN) request and response for content delivery in accordance with an example.

FIG. 2 illustrates an example of an information centric networking (ICN) request and response for content delivery. For example, a requestor (consumer/client) can send an interest packet with a prefix which names the content wanted by the requestor. A uniform resource identifier (URI) can be used to name the resources, which is constructed based on some naming convention. Each of the forwarding nodes can check the prefix of the interest packet and reply with the data packet that matches the prefix of the cached data. If there is no match, based on its FIB table, the forwarding node can forward the interest to one or more nodes. The interest packet can also reach the source (producer/server) and get the data packet from there. Multi-homing and multicast can be automatically enabled when more than one node can act as a source (producer/server) or more than one consumer is requesting the same content. Different from an end-to-end session, the ICN request/response mechanism is session-less and anchor-less, which leverages arbitrarily available caching and automatically incorporates content related routing. By design, ICN is a session-less protocol where a consumer (client) requests content (e.g., chuck of data) to the network and data is retrieved from wherever the content is in the network. ICN brings application layer optimizations down to a networking layer. That is, functionalities that are currently implemented in the application layer, such as edge computing (caching), are naturally supported by ICN in the network layer (L3).

Figure 3:
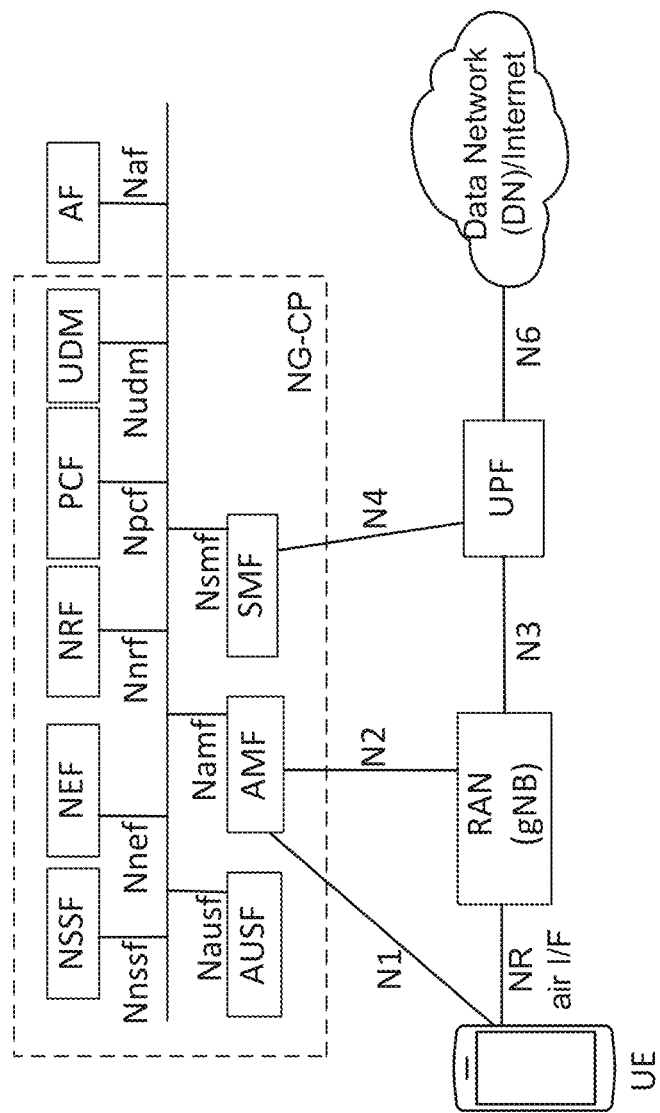
FIG. 3 illustrates a Fifth Generation (5G) architecture having a service-based interface representation in accordance with an example.

FIG. 3 illustrates an example of a Fifth Generation (5G) architecture having a service-based interface representation. This architecture can be designed following a control and user plane split (CUPS). There are some key features defined such as network slicing (NS), ultra-Reliable and low latency Communication (URLLC), anything as a service (XaaS), among others. The 5G network is designed following a communication model where a UE sends IP (and/or Ethernet and/or Non-IP) packets to a data network (DN) through sessions (such as protocol data unit (PDU) sessions). On the data plane, a user plane function (UPF) in 5G or a packet data network gateway (P-GW) in 4G can serve as an anchor and interact with other core network (CN) entities to manage the session. The data transport in a session can be based on a tunneling protocol and a preset route. Services with high mobility and low latency requirements such as vehicle-to-anything (V2X) communications can result in increased signaling redundancy to modify the sessions.

As shown in FIG. 3, the NG control plane (CP) can support an Access and Mobility Management function (AMF), which can support termination of non-access stratum (NAS) signaling, NAS ciphering & integrity protection, registration management, connection management, mobility management, access authentication and authorization, security context management. The NG CP can support a Session Management function (SMF), which can support session management (session establishment, modification, release), UE IP address allocation and management, DHCP functions, termination of NAS signaling related to session management, DL data notification, traffic steering configuration for UPF for proper traffic routing. The NG CP can support a user plane function (UPF), which can support packet routing and forwarding, packet inspection, QoS handling, acts as external PDU session point of interconnect to Data Network (DN), and is an anchor point for intra- and inter-RAT mobility. The NG CP can support a Policy Control Function (PCF), which can support a unified policy framework, providing policy rules to CP functions, access subscription information for policy decisions in UDR. The NG CP can support an Authentication Server Function (AUSF), which can act as an authentication server. The NG CP can include Unified Data Management (UDM), which can support generation of Authentication and Key Agreement (AKA) credentials, user identification handling, access authorization, subscription management. The NG CP can support an Application Function (AF), which can support application influence on traffic routing, accessing NEF, interaction with policy framework for policy control. The NG CP can support a Network Exposure function (NEF), which can support exposure of capabilities and events, secure provision of information from external application to 3GPP network, translation of internal/external information. The NG CP can support a NF Repository function (NRF), which can support a service discovery function, maintains NF profile and available NF instances. The NG CP can support a Network Slice Selection Function (NSSF), which can support selecting of the Network Slice instances to serve the UE, determining the allowed NSSAI, determining the AMF set to be used to serve the UE.

As shown in FIG. 3, a UE can communicate with a radio access network (RAN), which can include a gNB. The gNB can communicate with a data network (DN) or internet.

Today, with the sharp increase of subscribers and variety of services, the cellular network should evolve from a transport-like network to a data-centric network. The mobile devices can be content providers and/or consumers. ICN is a promising technology to meet the demand of efficient data delivery and leverage the new hardware capabilities such as opportunistic caching and multi-access edge computing (MEC). It is challenging to exploit the benefits/capabilities of ICN in 5G networks because the current 5G architecture targets at a different communication model.

As described herein, a 5G architecture is defined where a UE supports single stack (ICN stack) or dual stack (IP and ICN stacks) and can run ICN-based applications, or IP-based and ICN-based applications when dual stack is supported. Various aspects of an ICN-based architecture is described herein, such as, for example, a mechanism for an ICN application on a UE to request content that is stored anywhere in the 5G core network or DN.

In one example, the ICN protocol stack is content oriented and can store a state of the content request interest (i.e., PIT) and routing (i.e., FIB) on a per-hop basis inside the ICN nodes in the network. The named content is stored also in a distributed manner at different ICN nodes without notifying the network on which nodes have which content. Therefore, the native ICN, when supported in the cellular network, lacks of a mechanism to report the information to the network to control the ICN activities.

When enabling ICN in the 5G network, various problems have been identified. For example, as a first problem, an ICN data exchange does not need an IP address. The routing of ICN packets can follow the FIB defined for the next hop inside of each ICN node, generated based on protocols such as named-data link state routing protocol (NLSR). NLSR is distributed by nature and loop free. Mobility can be supported by sending a new interest packet, and security can be embedded in the data by signature. When sending an interest packet to request a named content, the consumer and the network do not know a source of the response data. That is, the data can come from a cached copy inside the cellular network, from a node in the DN or from the producer (source). Thus, the registration and PDU session management procedures in 5G do not apply directly and has some redundancy. As a second problem, other ICN-enabled nodes, except the first-hop node, do not know which UE sends an interest for a given named content. Vice versa, when a data packet comes back to the cellular network, a data plane anchor, i.e., an ICN-enabled UPF may not know the destination of the data. Thus, charging, quality of service (QoS) and other policies cannot be enforced, as defined in current 5G. As a third problem, the native ICN lacks of control about domain-wide naming and content management. When an ICN interest packet comes from an outside DN, an ICN-enabled UPF does not know whether the cellular network has the content or not.

In one example, the aforementioned problems are due to the fact that ICN has a different communication model compared to a PDU session. The information about ICN data exchange, the roles of consumer and producer, and routing, etc., is distributed in different ICN nodes but is to be collected for the network control and management.

In one example, past solutions have enabled ICN in the 5G architecture by reusing the current architecture and session management procedure. However, different from the native ICN mechanisms, the ICN scheme proposed in passed solutions does not leverage the ICN advantages such as content based routing inside the 5G CN and limits the flexibility of data caching and redistribution in the core network (CN) and brings increased signaling overhead, thus not efficient.

In one configuration, to solve the aforementioned problems, information (e.g., ICN context information) that is to be known by the network and managed by the ICN control function (ICN-CF) is identified. To facilitate the exchange of information, a new data plane entity, an ICN point of attachment (ICN-PoA), can act as a first point of contact for ICN to interface (or collocate) with a gNB to collect first hop related information, such as UE related information. To control ICN packets entering/leaving the cellular CN, an ICN Gateway (ICN-GW) can act as a gateway to interface the DN. The ICN-GW can be combined with the UPF (PSA), or PDU session anchor.

The present technology describes example procedures that allow such entities (e.g., ICN-PoA, ICN-GW) to facilitate ICN inside 5G and message exchange over new interfaces. As a result, efficient support for ICN related services in 5G networks can be enabled by properly adding functions to the architecture. Such a solution can leverage the network slicing concept and comply with the service centric 5G design. Moreover, the 5G network can handle IP, non-IP and/or Ethernet packets through its existing procedures and ICN packets through the proposed procedures.

Figure 4:
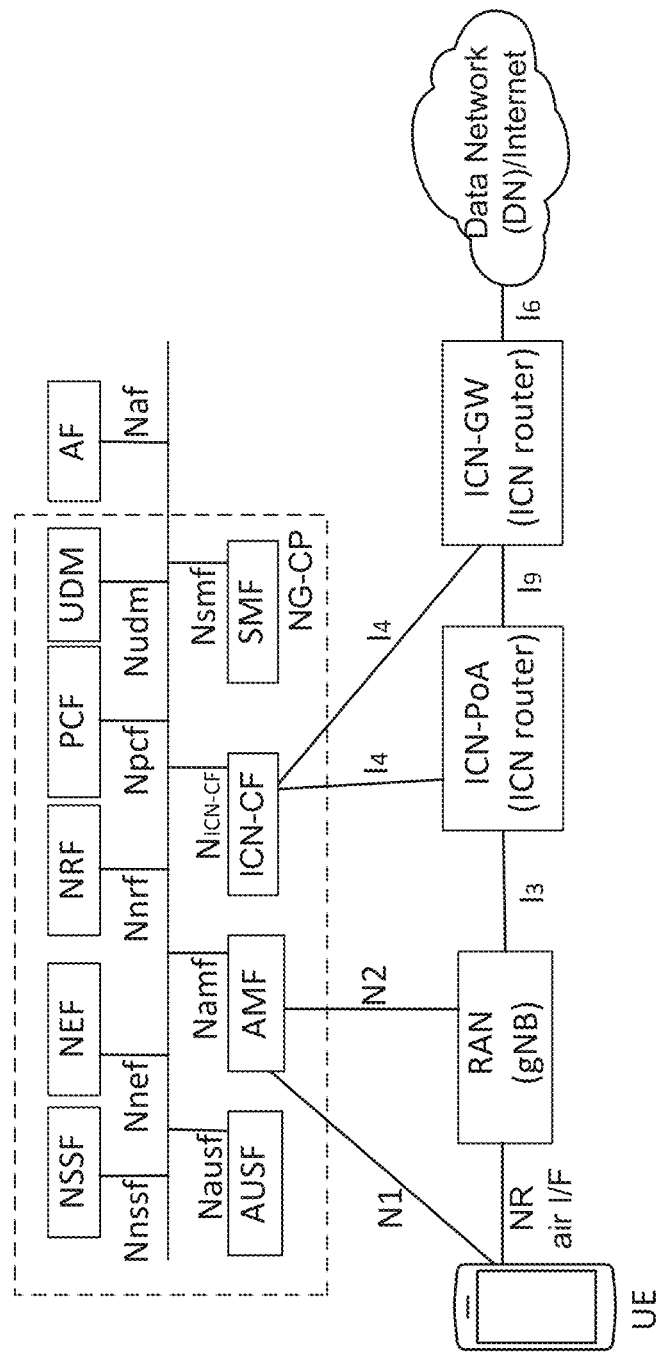
FIG. 4 illustrates a 5G cellular architecture with ICN in accordance with an example.

FIG. 4 illustrates an example of a 5G cellular architecture with ICN. For example, the cellular 5G architecture can be modified to reflect the new functions to support ICN schemes. An ICN-PoA can serve as a first ICN-aware user plane entity for UEs running ICN applications. An ICN-GW is a user plane ICN entity that interfaces with the DN. The DN can also support ICN-based schemes. The ICN-GW and the UPF PSA (PDU Session Anchor) can be in the same entity. That is, an ICN-UPF entity can be instantiated, where the functionality of the ICN-GW can be part of the UPF (PSA). The ICN-CF can handle the ICN related information and policy, and generate an ICN transaction history among other ICN related functionalities. These entities are functional entities and can go into existing CN entities to make a flexible implementation.

As shown in FIG. 4, the NG CP can include the ICN-CF. Further, a UE can communicate with a RAN, which can include a gNB. The RAN can communicate with an ICN-PoA (or ICN router), which can in turn communicate with an ICN-GW (or ICN router). The ICN-PoA and the ICN-GW can have access to the ICN-CF. In addition, the ICN-GW can access the data network (DN) or internet.

Figure 5:
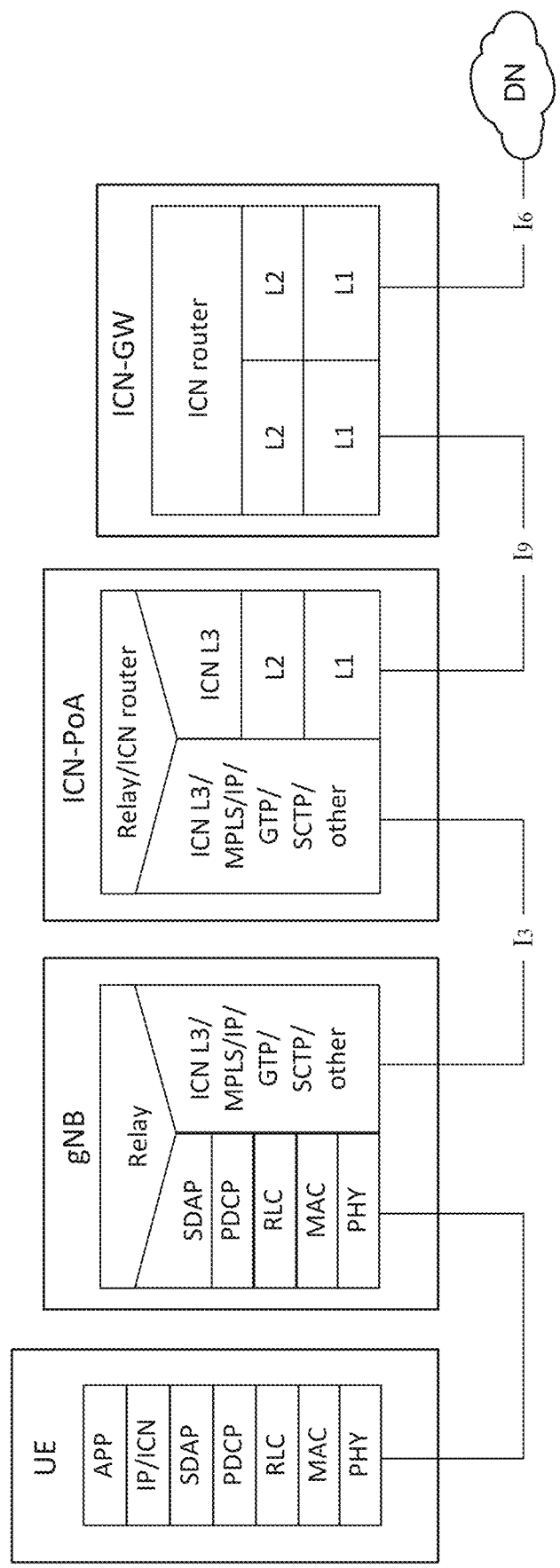
FIG. 5 illustrates a modified 5G cellular architecture with ICN in accordance with an example.

FIG. 5 illustrates an example of a modified 5G cellular architecture with ICN. A UE can communicate with a gNB. The gNB can communicate with an ICN-PoA. The ICN-PoA can communicate with an ICN-GW. The ICN-GW can communicate with the DN. The ICN-PoA and the ICN-GW, as well as an ICN-CF, can enable ICN in the 5G cellular architecture.

In one example, ICN related information, identified as ICN context information, can include but is not limited to: UE information, ICN application information, ICN service class/QoS information, ICN naming information, or ICN content publish/subscribe information.

In one example, the functionality of the ICN-CF includes, but is not limited to, parsing ICN context information, requesting ICN-related policy (or policies) from PCF, exposing ICN-related services to other entities, generating ICN-related transaction information, or acting as a trust anchor for intra-domain key management for routing protocol. Further, the ICN-CF can be a standalone CN entity or reside in the AMF, SMF or distribute its functions into multiple existing CN entities.

In one example, the functionality of the ICN-PoA includes, but is not limited to, an ICN router, interfacing with ICN-CF to report ICN related information, interfacing with gNB(s) to manage the ICN traffic from/towards gNB(s), handling ICN traffic from/to one or more gNBs, or serving as the first ICN network element that gNB(s) interact with in the core network. Further, one ICN-PoA can be allocated to manage the traffic of multiple gNBs. The ICN-PoA can also be collocated with a gNB and they can communicate via internal interfaces.

In one example, the functionality of the ICN-GW includes, but is not limited to, an ICN router that interfaces with the data network (DN), applying appropriate modifications to ICN packets entering/leaving the cellular CN, which includes protocol translation, adding/removing/modifying fields in the ICN packets, drop ICN packets, encapsulate ICN packets, among others, or packet filtering to select what packets can be forwarded towards the CN from the DN. Further, the ICN-GW can be a standalone CN entity or reside or combined in a UPF (PSA)

In one example, an interface $N_{ICN-CF}$ is the interface for other CN entities to exchange information with the ICN-CF. Interface $I_3$ can use any network technology (ICN, Ethernet, MPLS, GTP, IP, etc.) as a medium to exchange packets between the gNB and the ICN-PoA. Interface $I_4$ can exist between an ICN router and the ICN-CF to exchange ICN context information observed/generated at the data plane or ICN control information generated by the ICN-CF. Interfaces $I_6$ and $I_9$ can use any L2/L1 technology to natively exchange ICN packets (i.e., interest and data packets). Further, any ICN router inside the network, including the ICN-PoA and the ICN-GW, can provide caching capabilities.

Figure 6:
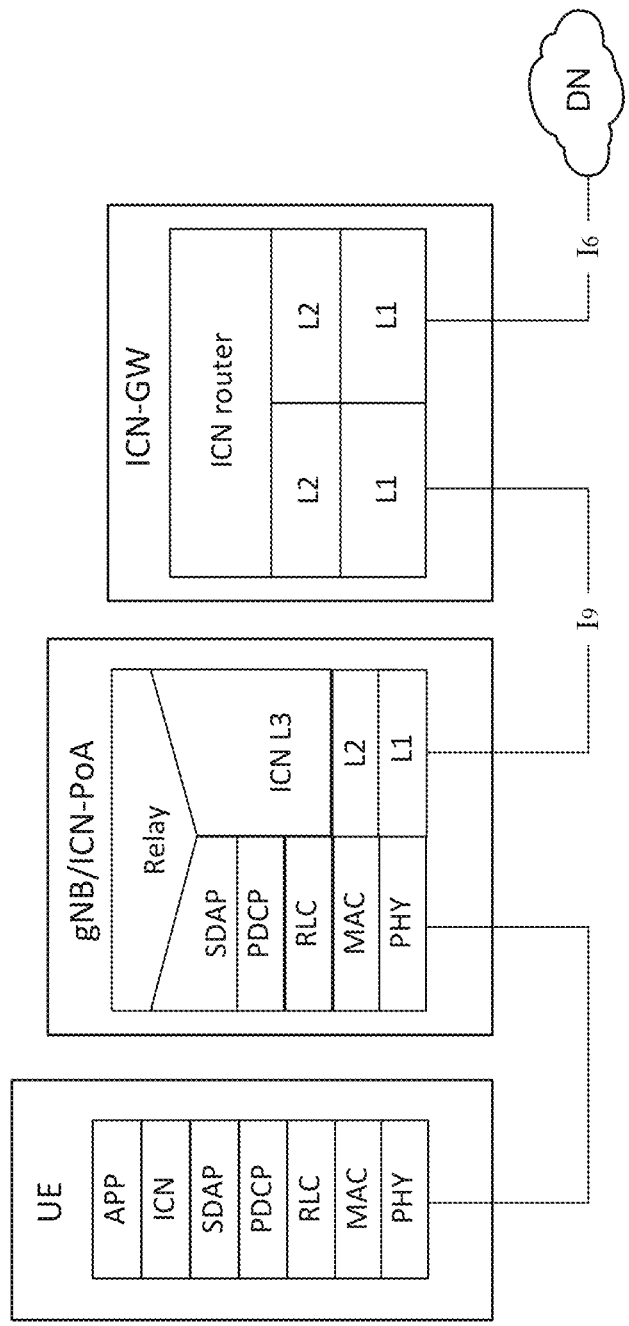
FIG. 6 illustrates a modified 5G cellular architecture with ICN that includes a combined Next Generation NodeB (gNB) and ICN-point of attachment (PoA) in accordance with an example.

FIG. 6 illustrates an example of a modified 5G cellular architecture with ICN that includes a combined gNB and ICN-PoA. In this case, the gNB and the ICN-PoA can reside in the same hardware, thereby enabling caching capabilities in the gNB. If the UE is requesting data that was previously requested from another UE, that data can be retrieved from the gNB without having the need to get the data from anywhere in the DN.

In one example, procedures for a UE registration for an ICN service and an ICN packet modification are described herein. These procedures can address the aforementioned problems. Additional procedures can be implemented to handle other functionalities, such as mobility, charging/billing, de-registration and others.

In one example, as a solution to the first problem as described above, a procedure can be modified to exchange ICN context information and assign a ICN-CF and ICN-PoA to a UE, and also notify the gNB on handling future ICN traffic. When a UE sends ICN traffic, the ICN-PoA can collect information (e.g., logs) used to report to the ICN-CF for the network to control and apply policies related to ICN traffic.

In one example, as a solution to the second problem as described above, the gNB has no knowledge of ICN routing capabilities. The ICN-PoA can be used to identify user information such as UE's identity and feed this information to the ICN-CF. The ICN-CF can generate charging, and QoS enforcement related information based on the report from the ICN-PoA and ICN-GW.

In one example, as a solution to the third problem as described above, the ICN-GW can filter incoming ICN packets and make necessary changes to the ICN packets, such that the ICN traffic (packets) are controlled and managed (based on the packet's name) in the cellular network.

Figure 7:
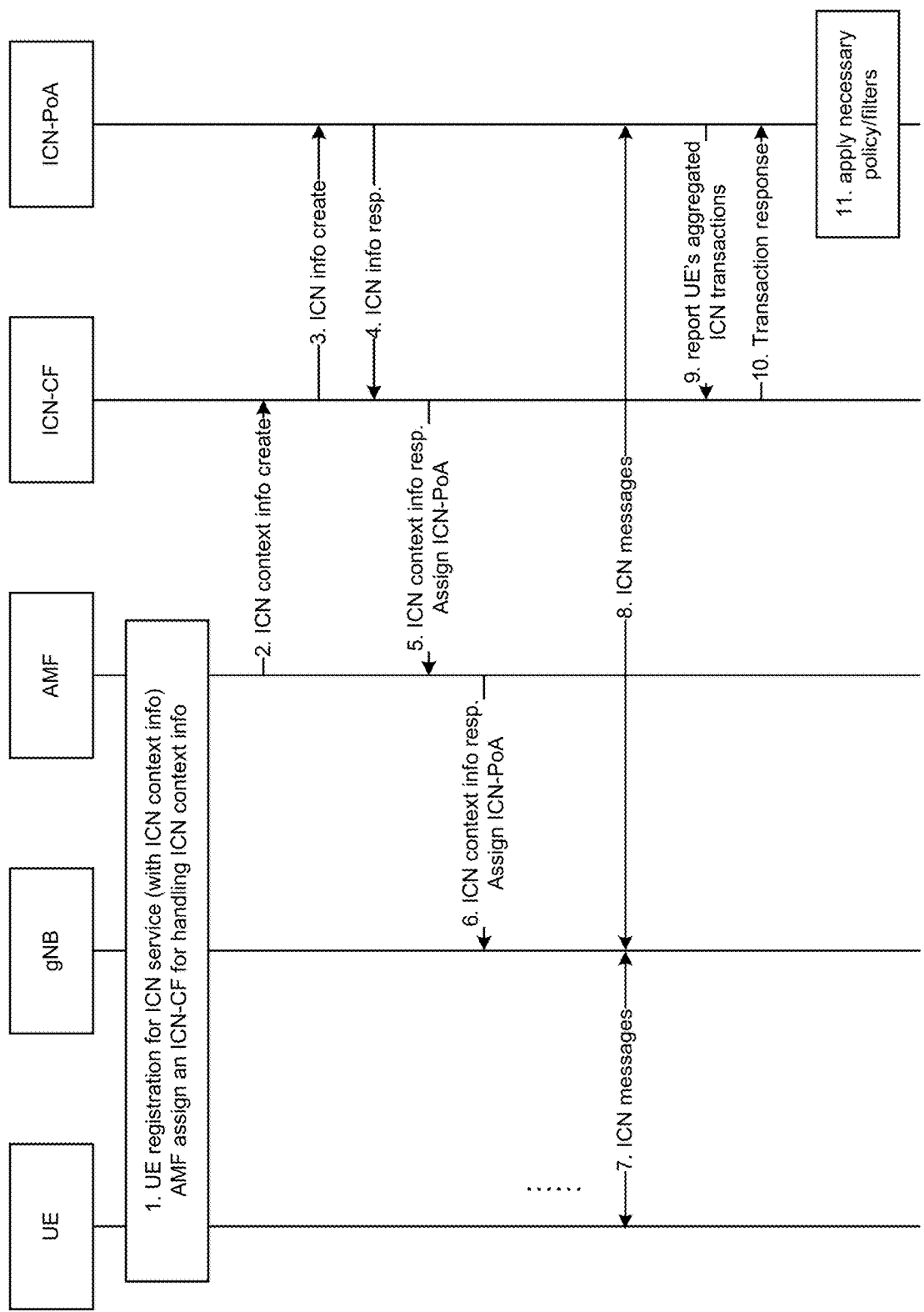
FIG. 7 illustrates a procedure for UE registration for an ICN service in accordance with an example.

FIG. 7 illustrates an example of a procedure for UE registration for an ICN service. In a first action, during the UE's registration procedure, the UE can report ICN context information to an AMF, which can include an indicator for the ICN service, UE's information such as its serving gNB, ICN application information, ICN service class and QoS information, ICN naming information and ICN publish/subscription information, etc. After appropriate authentication and check of subscription, the AMF can assign an ICN-CF to handle the UE's ICN context information. In a second action, the AMF can send the ICN context information to the assigned ICN-CF through a $N_{ICN-CF}$. In a third action, the ICN-CF can assign an ICN-PoA to handle the UE's ICN traffic, and can send related ICN information to the ICN-PoA through $I_4$. In a fourth action, the ICN-PoA can send a reply to the ICN-CF through $I_4$. In a fifth action, the ICN-CF can send, through an $N_{ICN-CF}$, to the AMF information about the assigned ICN-PoA for ICN traffic. In a sixth action, a gNB can download the UE's context information including necessary ICN context and the assigned ICN-PoA information. In a seventh action, the UE can send and/or receive ICN messages (interest and data packets). In an eight action, the gNB can forward the ICN messages to the assigned ICN-PoA through I3. In a ninth action, the ICN messages can be forwarded to the ICN-PoA for related filtering and modification, etc. The ICN-PoA can send aggregated information about ICN transactions to the ICN-CF through $I_4$ for different purposes, such as charging or QoS enforcement. In a tenth action, the ICN-CF can reply with modifications of ICN information. In an eleventh action, the ICN-PoA can apply any new policies instructed by the ICN-CF.

In one example, the UE registration can be combined with an ICN-PoA allocation/assignment procedure, as shown in FIG. 7. However, as an alternative, the UE registration and the ICN-PoA allocation/assignment procedure may not be combined, and instead can be separate procedures.

Figure 8:
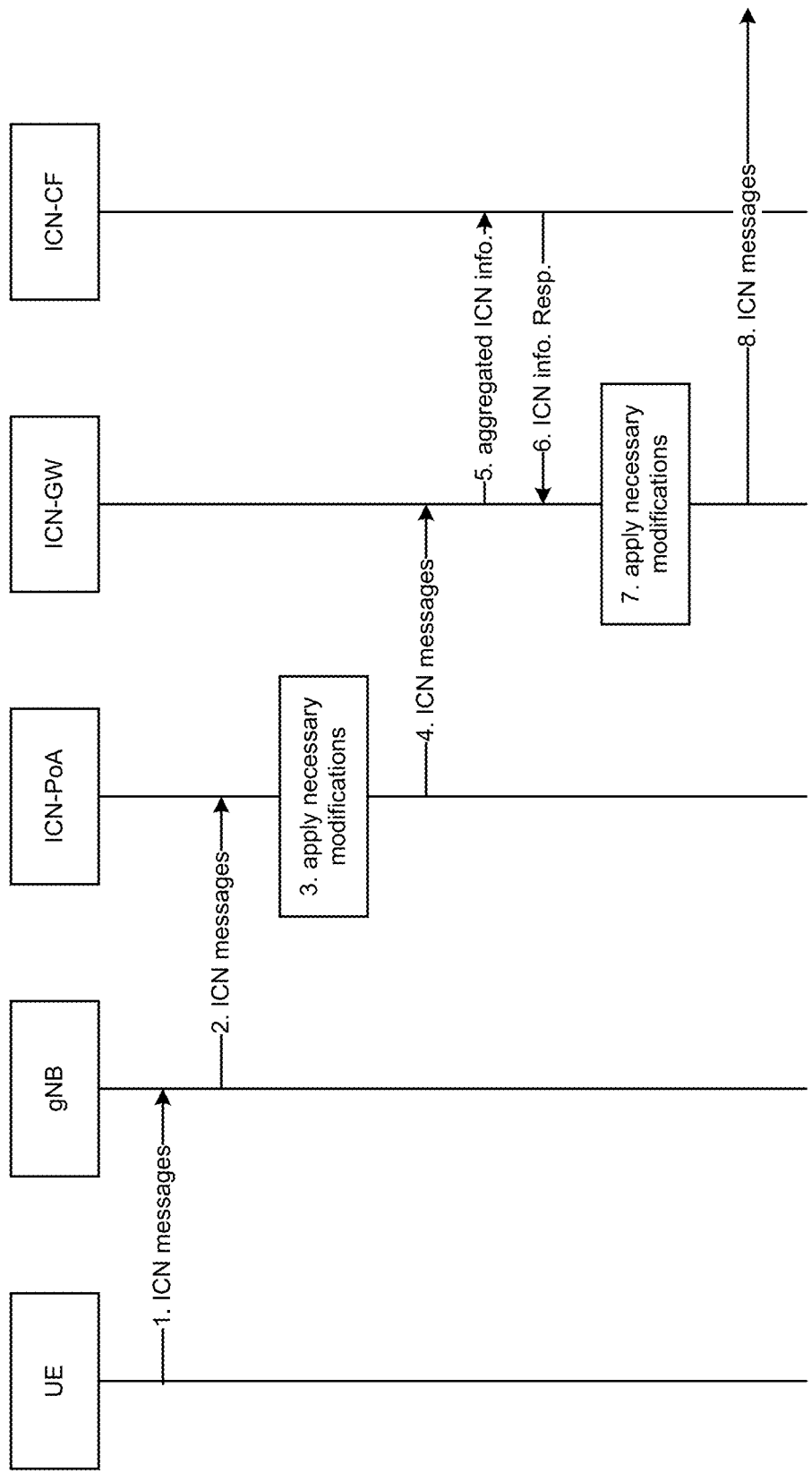
FIG. 8 illustrates a procedure for an ICN packet modification inside a core network in accordance with an example.

FIG. 8 illustrates an example of a procedure for an ICN packet modification inside a core network. In a first action, a UE can send ICN messages to a gNB as data plane traffic. In a second action, the gNB can forward the ICN message to an assigned ICN-PoA through $I_3$. In a third action, the ICN-PoA can apply necessary modifications to the ICN messages. In a fourth action, if there is no cached copy of the content inside the CN, an ICN-GW can receive the ICN messages. In a fifth action, the ICN-GW can report aggregated ICN activities to the ICN-CF. In a sixth action, the ICN-CF can instruct with necessary rules to ICN-GW through $I_4$. In a seventh action, the ICN-GW can apply necessary modifications to the ICN packet before sending the ICN packet, where the modifications can include protocol translation, modification to the ICN packet, etc. In an eight action, the ICN message can be sent to the DN.

In one configuration, a control plane entity, such as an ICN-CF, can manage ICN context information. A data plane entity, such as an ICN-PoA, can serve as a first point of contact for ICN packets from a UE to report ICN context information or information that can generate ICN context information. A data plane entity, such as an ICN-GW, can interface with DNs to make appropriate modifications to the ICN packet entering/leaving the CN.

Further, an interface I3 between a gNB and an ICN-PoA can be used to exchange ICN packets and ICN context information. An interface I4 between an ICN router and an ICN-CF can be used to exchange ICN context information or information that can generate ICN context information. Interfaces I6 and I9 between ICN routers can be used to exchange native ICN packets.

Figure 9:
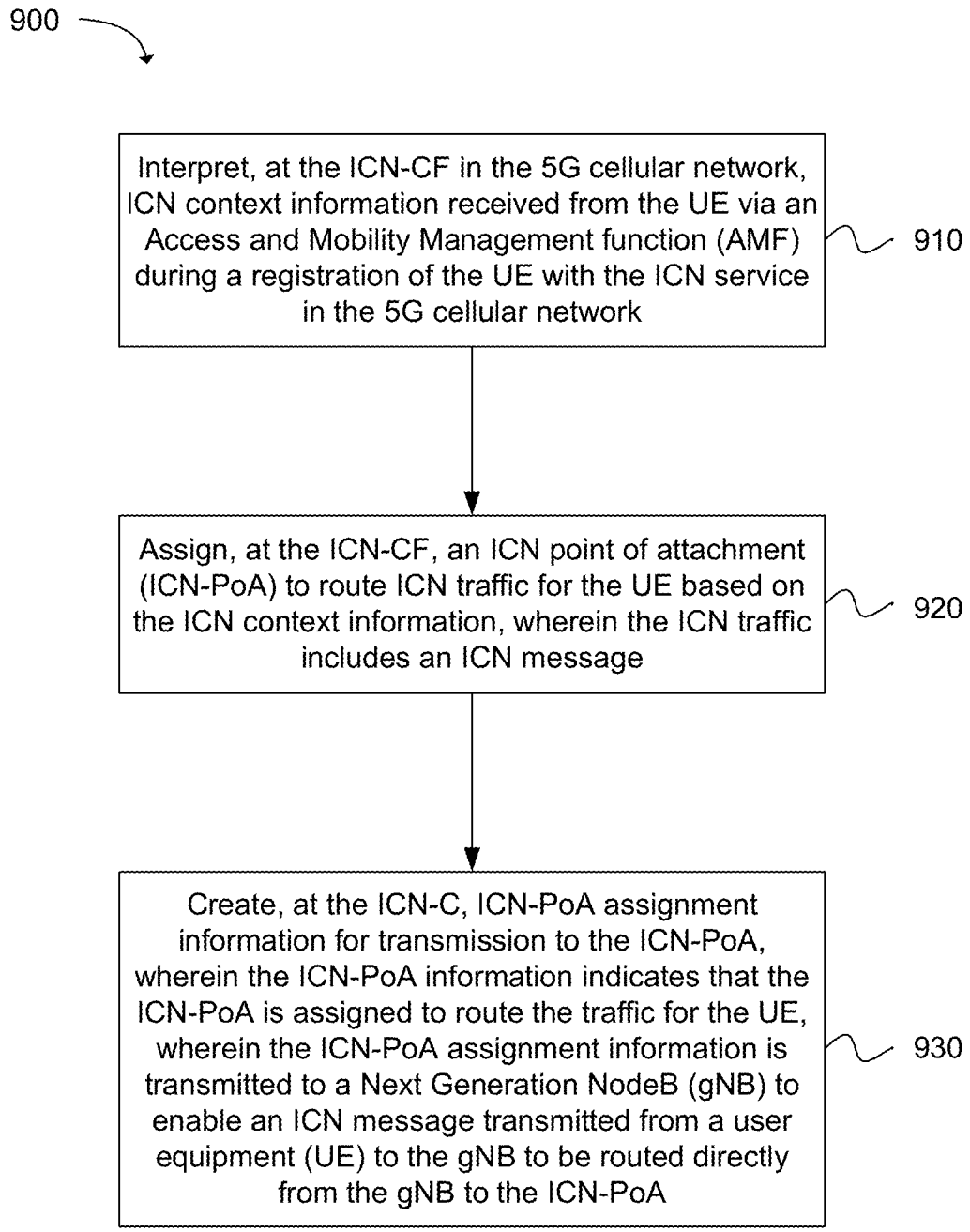
FIG. 9 depicts functionality of an Information Centric Networking control function (ICN-CF) operable to register a user equipment (UE) for an ICN service in a Fifth Generation (5G) cellular network in accordance with an example.

In one example, as described above, a procedure is defined for a UE with an ICN application to register an ICN service to the network and exchange ICN context information with the CN. Further, as described above, a procedure is defined for the ICN-GW to report ICN related information to the ICN-CF and apply necessary modifications to ICN packets leaving/entering the CN Another example provides functionality 900 of an Information Centric Networking control function (ICN-CF) operable to register a user equipment (UE) for an ICN service in a Fifth Generation (5G) cellular network, as shown in FIG. 9. The ICN-CF can comprise one or more processors configured to interpret, at the ICN-CF in the 5G cellular network, ICN context information received from the UE via an Access and Mobility Management function (AMF) during a registration of the UE with the ICN service in the 5G cellular network, as in block 910. The ICN-CF can comprise one or more processors configured to assign, at the ICN-CF, an ICN point of attachment (ICN-PoA) to route ICN traffic for the UE based on the ICN context information, wherein the ICN traffic includes an ICN message, as in block 920. The ICN-CF can comprise one or more processors configured to create, at the ICN-CF, ICN-PoA assignment information for transmission to the ICN-PoA, wherein the ICN-PoA information indicates that the ICN-PoA is assigned to route the traffic for the UE, wherein the ICN-PoA assignment information is transmitted to a Next Generation NodeB (gNB) to enable an ICN message transmitted from a user equipment (UE) to the gNB to be routed directly from the gNB to the ICN-PoA, as in block 930. In addition, the ICN-CF can comprise a memory interface configured to send to a memory the ICN context information.

Figure 10:
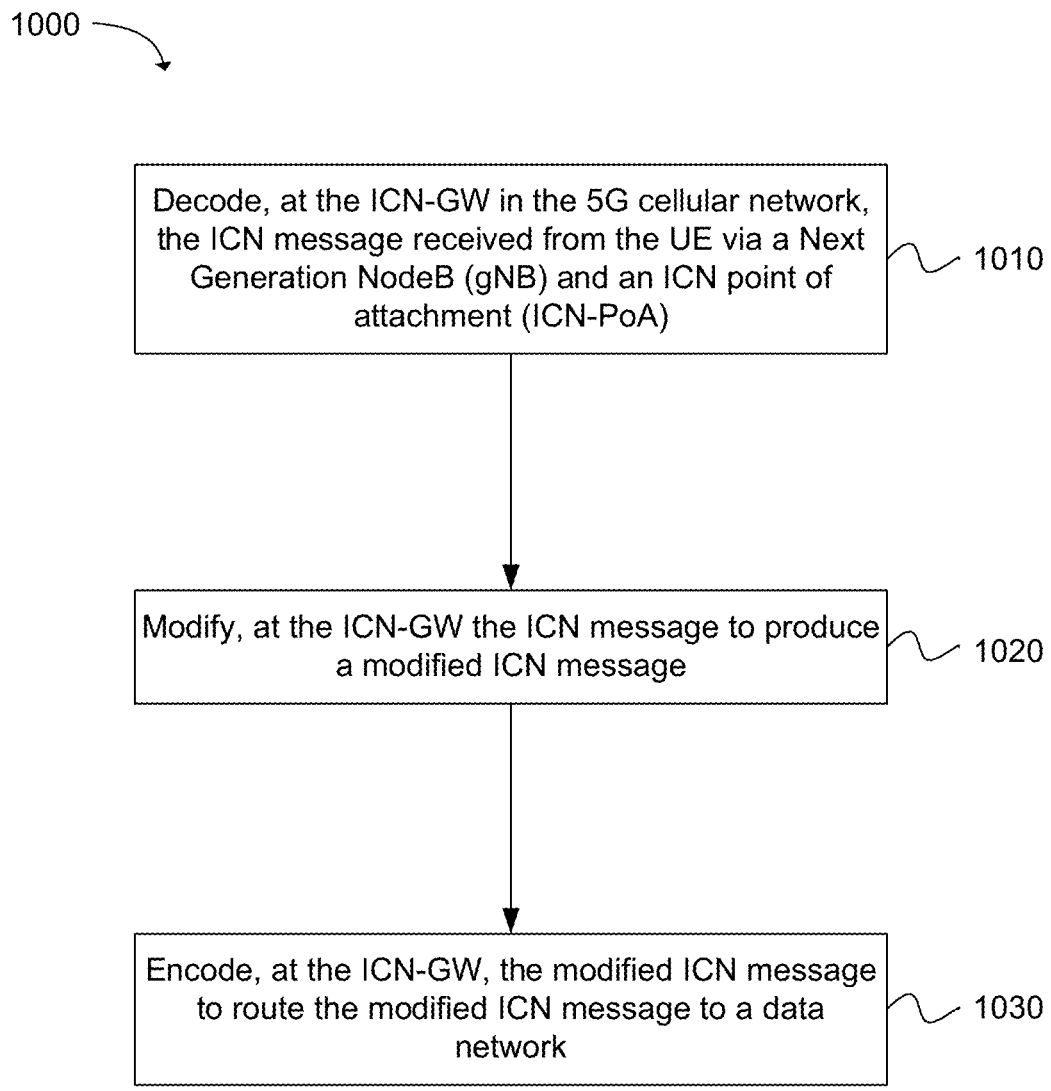
FIG. 10 depicts functionality of an Information Centric Networking gateway (ICN-GW) operable to modify an ICN message received from a user equipment (UE) in a Fifth Generation (5G) cellular network in accordance with an example.

Another example provides functionality 1000 of an Information Centric Networking gateway (ICN-GW) operable to modify an ICN message received from a user equipment (UE) in a Fifth Generation (5G) cellular network, as shown in FIG. 10. The ICN-GW can comprise one or more processors configured to decode, at the ICN-GW in the 5G cellular network, the ICN message received from the UE via a Next Generation NodeB (gNB) and an ICN point of attachment (ICN-PoA), as in block 1010. The ICN-GW can comprise one or more processors configured to modify, at the ICN-GW the ICN message to produce a modified ICN message, as in block 1020. The ICN-GW can comprise one or more processors configured to encode, at the ICN-GW, the modified ICN message to route the modified ICN message to a data network, as in block 1030. In addition, the ICN-GW can comprise a memory interface configured to send to a memory the modified ICN message.

Figure 11:
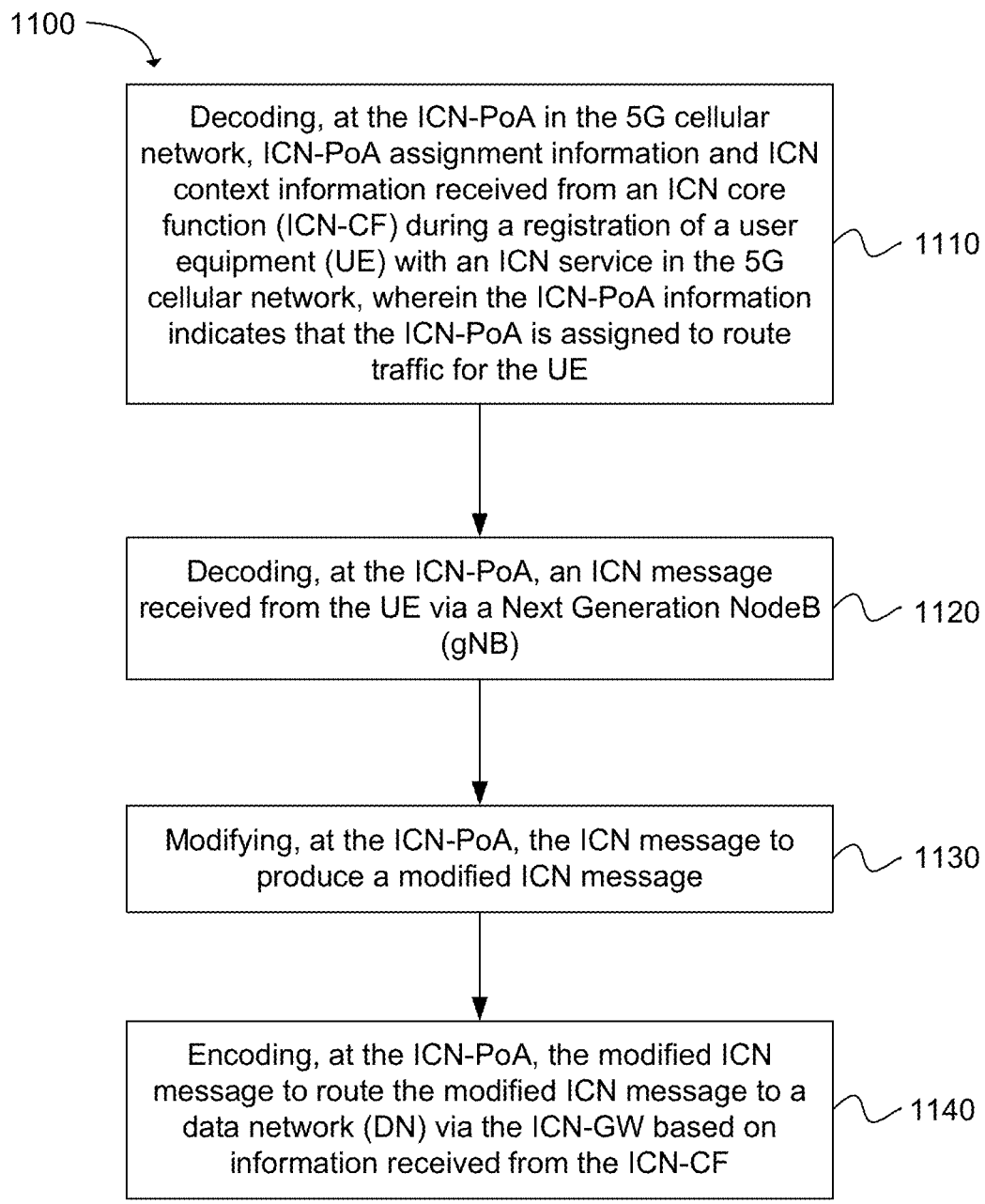
FIG. 11 depicts a flowchart of a machine readable storage medium having instructions embodied thereon for operating an Information Centric Networking point of attachment (ICN-PoA) in a Fifth Generation (5G) cellular network in accordance with an example.

Another example provides at least one machine readable storage medium having instructions 1100 embodied thereon for operating an Information Centric Networking point of attachment (ICN-PoA) in a Fifth Generation (5G) cellular network, as shown in FIG. 11. The instructions can be executed on a machine, where the instructions are included on at least one computer readable medium or one non-transitory machine readable storage medium. The instructions when executed by one or more processors perform: decoding, at the ICN-PoA in the 5G cellular network, ICN-PoA assignment information and ICN context information received from an ICN control function (ICN-CF) during a registration of a user equipment (UE) with an ICN service in the 5G cellular network, wherein the ICN-PoA information indicates that the ICN-PoA is assigned to route traffic for the UE, as in block 1110. The instructions when executed by one or more processors perform: decoding, at the ICN-PoA, an ICN message received from the UE via a Next Generation NodeB (gNB), as in block 1120. The instructions when executed by one or more processors perform: modifying, at the ICN-PoA, the ICN message to produce a modified ICN message, as in block 1130. The instructions when executed by one or more processors perform: encoding, at the ICN-PoA, the modified ICN message to route the modified ICN message to a data network (DN) via the ICN-GW based on information received from the ICN-CF, as in block 1140.

Figure 12:
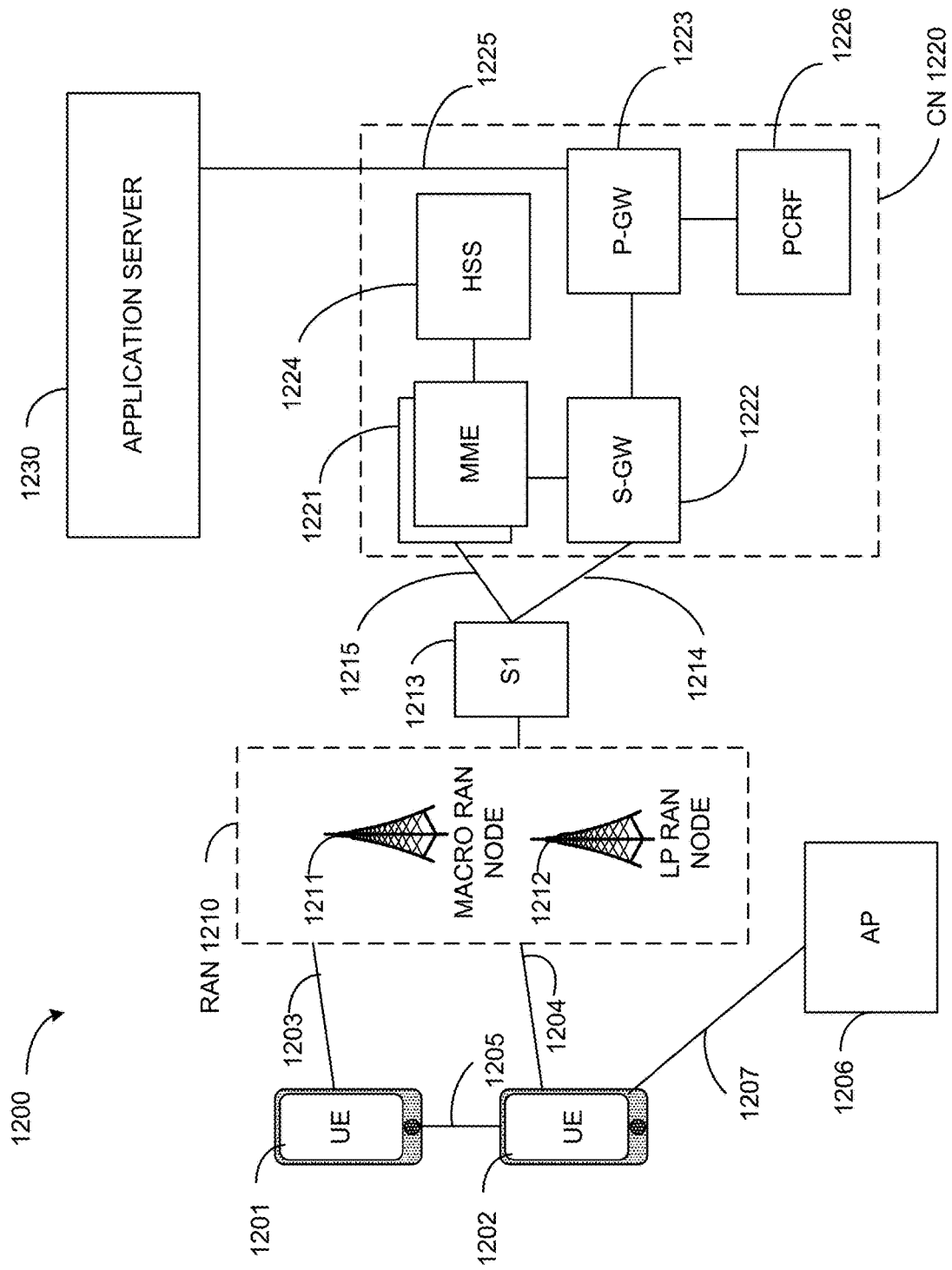
FIG. 12 illustrates an architecture of a wireless network in accordance with an example.

FIG. 12 illustrates an architecture of a system 1200 of a network in accordance with some embodiments. The system 1200 is shown to include a user equipment (UE) 1201 and a UE 1202. The UEs 1201 and 1202 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 and 1202 may be configured to connect, e.g., communicatively couple, with a radio access network (RAN) 1210—the RAN 1210 may be, for example, an Evolved Universal Mobile Telecommunications System (UMTS) Terrestrial Radio Access Network (E-UTRAN), a NextGen RAN (NG RAN), or some other type of RAN. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 may further directly exchange communication data via a ProSe interface 1205. The ProSe interface 1205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 802.14 protocol, wherein the AP 1206 would comprise a wireless fidelity (WiFi®) router. In this example, the AP 1206 is shown to be connected to the Internet without connecting to the core network of the wireless system (described in further detail below).

The RAN 1210 can include one or more access nodes that enable the connections 1203 and 1204. These access nodes (ANs) can be referred to as base stations (B Ss), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1210 may include one or more RAN nodes for providing macrocells, e.g., macro RAN node 1211, and one or more RAN nodes for providing femtocells or picocells (e.g., cells having smaller coverage areas, smaller user capacity, or higher bandwidth compared to macrocells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the RAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1201 and 1202. The physical downlink control channel (PDCCH) may carry information about the transport format and resource allocations related to the PDSCH channel, among other things. It may also inform the UEs 1201 and 1202 about the transport format, resource allocation, and H-ARQ (Hybrid Automatic Repeat Request) information related to the uplink shared channel. Typically, downlink scheduling (assigning control and shared channel resource blocks to the UE 1201 within a cell) may be performed at any of the RAN nodes 1211 and 1212 based on channel quality information fed back from any of the UEs 1201 and 1202. The downlink resource assignment information may be sent on the PDCCH used for (e.g., assigned to) each of the UEs 1201 and 1202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1210 is shown to be communicatively coupled to a core network (CN) 1220—via an S1 interface 1213. In embodiments, the CN 1220 may be an evolved packet core (EPC) network, a NextGen Packet Core (NPC) network, or some other type of CN. In this embodiment the S1 interface 1213 is split into two parts: the S1-U interface 1214, which carries traffic data between the RAN nodes 1211 and 1212 and the serving gateway (S-GW) 1222, and the S1-mobility management entity (MME) interface 1215, which is a signaling interface between the RAN nodes 1211 and 1212 and MMEs 1221.

In this embodiment, the CN 1220 comprises the MMEs 1221, the S-GW 1222, the Packet Data Network (PDN) Gateway (P-GW) 1223, and a home subscriber server (HSS) 1224. The MMEs 1221 may be similar in function to the control plane of legacy Serving General Packet Radio Service (GPRS) Support Nodes (SGSN). The MMEs 1221 may manage mobility aspects in access such as gateway selection and tracking area list management. The HSS 1224 may comprise a database for network users, including subscription-related information to support the network entities' handling of communication sessions. The CN 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 may terminate the S1 interface 1213 towards the RAN 1210, and routes data packets between the RAN 1210 and the CN 1220. In addition, the S-GW 1222 may be a local mobility anchor point for inter-RAN node handovers and also may provide an anchor for inter-3GPP mobility. Other responsibilities may include lawful intercept, charging, and some policy enforcement.

The P-GW 1223 may terminate an SGi interface toward a PDN. The P-GW 1223 may route data packets between the EPC network 1223 and external networks such as a network including the application server 1230 (alternatively referred to as application function (AF)) via an Internet Protocol (IP) interface 1225. Generally, the application server 1230 may be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the CN 1220.

The P-GW 1223 may further be a node for policy enforcement and charging data collection. Policy and Charging Enforcement Function (PCRF) 1226 is the policy and charging control element of the CN 1220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate Quality of Service (QoS) and charging parameters. The PCRF 1226 may provision this rule into a Policy and Charging Enforcement Function (PCEF) (not shown) with the appropriate traffic flow template (TFT) and QoS class of identifier (QCI), which commences the QoS and charging as specified by the application server 1230.

Figure 13:
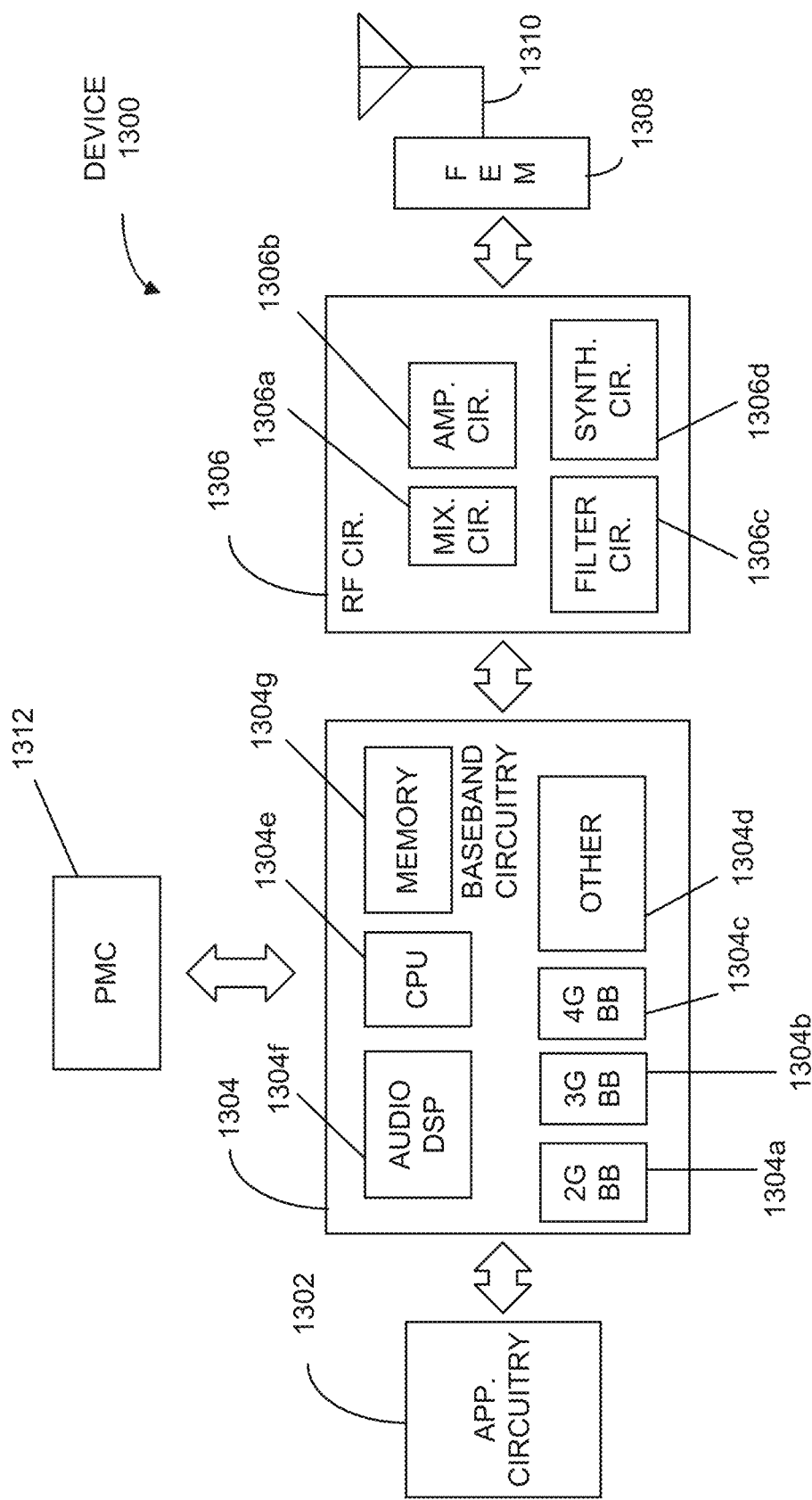
FIG. 13 illustrates a diagram of a wireless device (e.g., UE) in accordance with an example.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304a, a fourth generation (4G) baseband processor 1304b, a fifth generation (5G) baseband processor 1304c, or other baseband processor(s) 1304d for other existing generations, generations in development or to be developed in the future (e.g., second generation (2G), sixth generation (6G), etc.). The baseband circuitry 1304 (e.g., one or more of baseband processors 1304a-d) may handle various radio control functions that enable communication with one or more radio networks via the RF circuitry 1306. In other embodiments, some or all of the functionality of baseband processors 1304a-d may be included in modules stored in the memory 1304g and executed via a Central Processing Unit (CPU) 1304e. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304f. The audio DSP(s) 1304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry

1306*d* may be a delta-sigma synthesizer, a frequency multiplier, or a synthesizer comprising a phase-locked loop with a frequency divider.

The synthesizer circuitry 1306*d* may be configured to synthesize an output frequency for use by the mixer circuitry 1306*a* of the RF circuitry 1306 based on a frequency input and a divider control input. In some embodiments, the synthesizer circuitry 1306*d* may be a fractional N/N+1 synthesizer.

In some embodiments, frequency input may be provided by a voltage controlled oscillator (VCO), although that is not a requirement. Divider control input may be provided by either the baseband circuitry 1304 or the application circuitry 1302 depending on the desired output frequency. In some embodiments, a divider control input (e.g., N) may be determined from a look-up table based on a channel indicated by the application circuitry 1302.

Synthesizer circuitry 1306*d* of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM circuitry 1308, or in both the RF circuitry 1306 and the FEM circuitry 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM circuitry 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
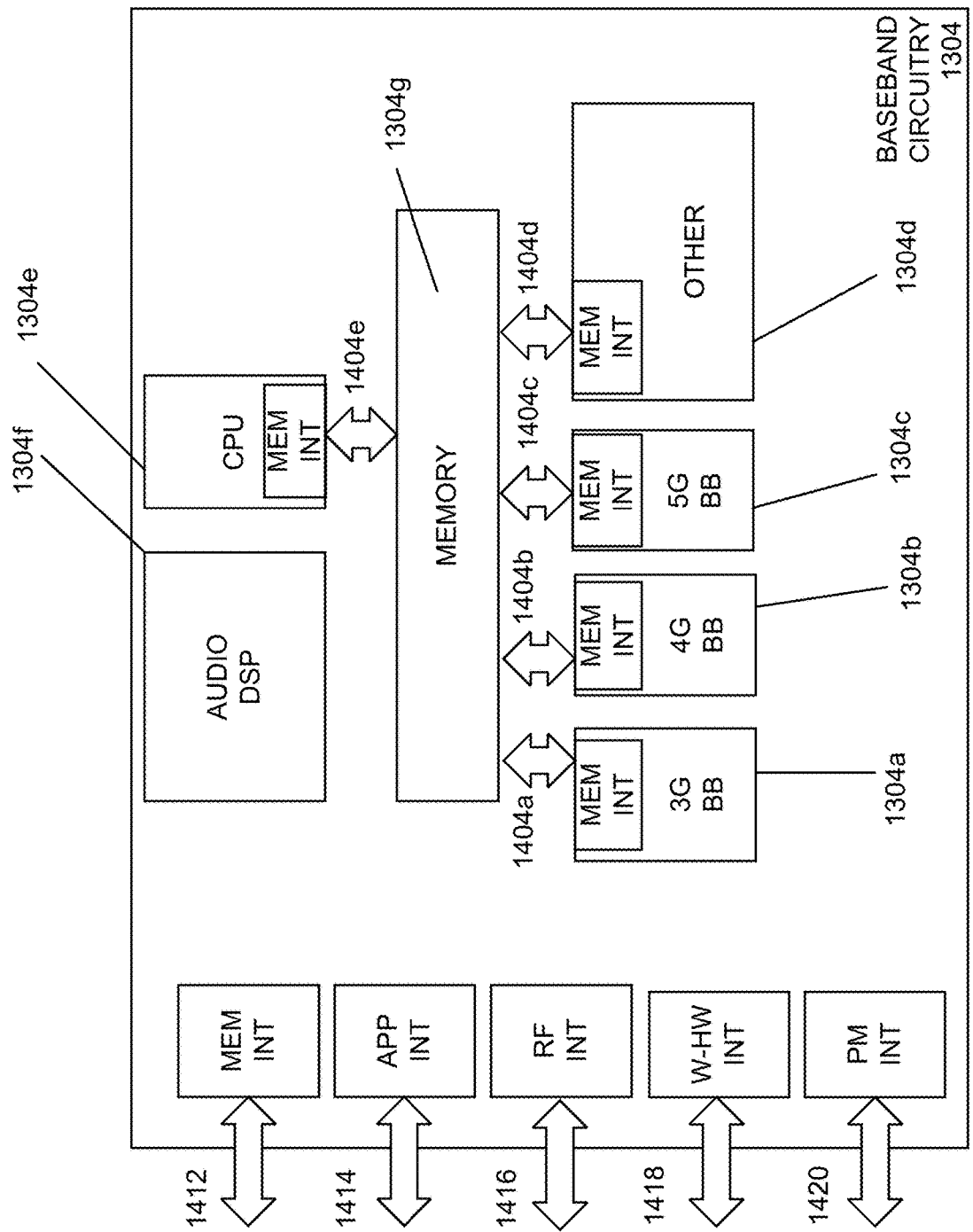
FIG. 14 illustrates interfaces of baseband circuitry in accordance with an example.

FIG. 14 illustrates example interfaces of baseband circuitry in accordance with some embodiments. As discussed above, the baseband circuitry 1304 of FIG. 13 may comprise processors 1304*a*-1304*e* and a memory 1304*g* utilized by said processors. Each of the processors 1304*a*-1304*e* may include a memory interface, 1404*a*-1404*e*, respectively, to send/receive data to/from the memory 1304*g*.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Figure 15:
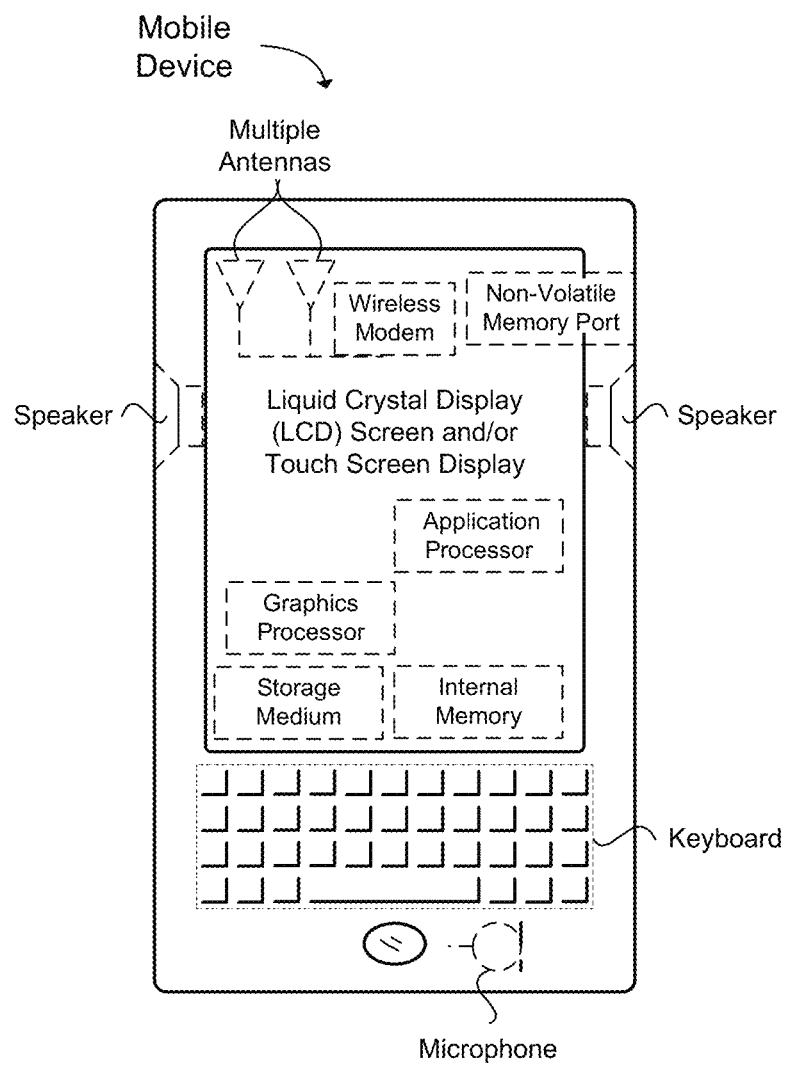
FIG. 15 illustrates a diagram of a wireless device (e.g., UE) in accordance with an example.

FIG. 15 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 15 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of an Information Centric Networking control function (ICN-CF) operable to register a user equipment (UE) for an ICN service in a Fifth Generation (5G) cellular network, the apparatus comprising: one or more processors configured to: interpret, at the ICN-CF in the 5G cellular network, ICN context information received from the UE via an Access and Mobility Management function (AMF) during a registration of the UE with the ICN service in the 5G cellular network; assign, at the ICN-CF, an ICN point of attachment (ICN-PoA) to route ICN traffic for the UE based on the ICN context information, wherein the ICN traffic includes an ICN message; create, at the ICN-CF, ICN-PoA assignment information for transmission to the ICN-PoA, wherein the ICN-PoA information indicates that the ICN-PoA is assigned to route the traffic for the UE, wherein the ICN-PoA assignment information is transmitted to a Next Generation NodeB (gNB) to enable an ICN message transmitted from a user equipment (UE) to the gNB to be routed directly from the gNB to the ICN-PoA; and a memory interface configured to send to a memory the ICN context information.

Example 2 includes the apparatus of Example 1, further comprising a transceiver configured to: receive the ICN context information from the UE via the AMF; and transmit the ICN-PoA assignment information to the AMF.

Example 3 includes the apparatus of any of Examples 1 to 2, wherein the ICN context information includes one or more of: an indicator for the ICN service, a serving gNB associated with the UE, ICN application information, an ICN service class, quality of service (QoS) information, ICN naming information, or ICN publish/subscription information.

Example 4 includes the apparatus of any of Examples 1 to 4, wherein the ICN message includes interest and data packets.

Example 5 includes the apparatus of any of Examples 1 to 4, wherein the one or more processors are configured to: decode aggregated information about ICN transactions received from the ICN-PoA, wherein the aggregated information about ICN transactions is useable for charging or quality of service (QoS) enforcement.

Example 6 includes the apparatus of any of Examples 1 to 5, wherein the one or more processors are configured to: encode ICN modification information for transmission to the ICN-PoA.

Example 7 includes the apparatus of any of Examples 1 to 6, wherein the one or more processors are configured to: encode new policy information for transmission to the ICN-PoA to enable a new policy to be applied at the ICN-PoA.

Example 8 includes the apparatus of any of Examples 1 to 7, wherein the ICN-CF is a standalone core network entity or is included in the AMF.

Example 9 includes the apparatus of any of Examples 1 to 8, wherein the ICN-CF is a control plane entity configured to manage the ICN context information.

Example 10 includes an apparatus of an Information Centric Networking gateway (ICN-GW) operable to modify an ICN message received from a user equipment (UE) in a Fifth Generation (5G) cellular network, the apparatus comprising: one or more processors configured to: decode, at the ICN-GW in the 5G cellular network, the ICN message received from the UE via a Next Generation NodeB (gNB) and an ICN point of attachment (ICN-PoA); modify, at the ICN-GW, the ICN message to produce a modified ICN message; and encode, at the ICN-GW, the modified ICN message to route the modified ICN message to a data network; and a memory interface configured to send to a memory the modified ICN message.

Example 11 includes the apparatus of Example 10, further comprising a transceiver configured to: receive the ICN message from the UE via the gNB and the ICN-PoA; and transmit the modified ICN message to the DN.

Example 12 includes the apparatus of any of Examples 10 to 11, wherein the one or more processors are configured to: encode aggregated ICN activity information for transmission to the ICN-CF; and decode an ICN information response received from the ICN-CF.

Example 13 includes the apparatus of any of Examples 10 to 12, wherein the ICN-GW is a data plane entity configured to interface with the DN to modify ICN messages entering or leaving the 5G cellular network having ICN.

Example 14 includes the apparatus of any of Examples 10 to 13, wherein the ICN-PoA is a data plane entity configured to serve as a first point of contact for ICN messages received from the UE.

Example 15 includes at least one machine readable storage medium having instructions embodied thereon for operating an Information Centric Networking point of attachment (ICN-PoA) in a Fifth Generation (5G) cellular network, the instructions when executed by one or more processors perform the following: decoding, at the ICN-PoA in the 5G cellular network, ICN-PoA assignment information and ICN context information received from an ICN control function (ICN-CF) during a registration of a user equipment (UE) with an ICN service in the 5G cellular network, wherein the ICN-PoA information indicates that the ICN-PoA is assigned to route traffic for the UE; decoding, at the ICN-PoA, an ICN message received from the UE via a Next Generation NodeB (gNB); modifying, at the ICN-PoA, the ICN message to produce a modified ICN message; and encoding, at the ICN-PoA, the modified ICN message to route the modified ICN message to a data network (DN) via the ICN-GW based on information received from the ICN-CF.

Example 16 includes the at least one machine readable storage medium of Example 15, wherein the ICN context information includes one or more of: an indicator for an ICN service, a serving gNB associated with the UE, ICN application information, an ICN service class, quality of service (QoS) information, ICN naming information, or ICN publish/subscription information.

Example 17 includes the at least one machine readable storage medium of any of Examples 15 to 16, further comprising instructions when executed perform the following: encoding aggregated information about ICN transactions for transmission to the ICN-CF.

Example 18 includes the at least one machine readable storage medium of any of Examples 15 to 17, further comprising instructions when executed perform the following: decoding new policy information received from the ICN-CF; and applying a new policy at the ICN-PoA using the new policy information.

Example 19 includes the at least one machine readable storage medium of any of Examples 15 to 18, wherein the ICN-PoA is allocated to manage traffic of multiple gNBs.

Example 20 includes the at least one machine readable storage medium of any of Examples 15 to 19, wherein the ICN-PoA is collocated with the gNB.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

The invention claimed is:

1. An apparatus of an Information Centric Networking gateway (ICN-GW) operable to modify an ICN message received from a user equipment (UE) in a Fifth Generation (5G) cellular network, the apparatus comprising:
   one or more processors configured to:
   encode aggregated ICN activity information for transmission to an Information Centric Networking control function (ICN-CF);
   decode an ICN information response received from the ICN-CF;
   decode, at the ICN-GW in the 5G cellular network, the ICN message received from the UE via a Next Generation NodeB (gNB) and an ICN point of attachment (ICN-PoA);
   modify, at the ICN-GW, the ICN message to produce a modified ICN message; and
   encode, at the ICN-GW, the modified ICN message to route the modified ICN message to a data network (DN); and
   a memory interface configured to send to a memory the modified ICN message.

2. The apparatus of claim 1, further comprising a transceiver configured to:
   receive the ICN message from the UE via the gNB and the ICN-PoA; and
   transmit the modified ICN message to the data network.

3. The apparatus of claim 1, wherein the ICN-GW is a data plane entity configured to interface with the DN to modify ICN messages entering or leaving the 5G cellular network having ICN.

4. The apparatus of claim 3, wherein the ICN messages include one or both of ICN packets and ICN context information.

5. The apparatus of claim 1, wherein the ICN-PoA is a data plane entity configured to serve as a first point of contact for ICN messages received from the UE.

6. The apparatus of claim 5, wherein the ICN messages include one or both of ICN packets and ICN context information.

7. A non-transitory computer-readable storage medium of an Information Centric Networking gateway (ICN-GW) operable to modify an ICN message received from a user equipment (UE) in a Fifth Generation (5G) cellular network, the computer-readable storage medium having computer-readable instructions stored thereon, the computer readable instructions configured to instruct one or more processors to:
   encode aggregated ICN activity information for transmission to an Information Centric Networking control function (ICN-CF);
   decode an ICN information response received from the ICN-CF;
   decode, at the ICN-GW in the 5G cellular network, the ICN message received from the UE via a Next Generation NodeB (gNB) and an ICN point of attachment (ICN-PoA);
   modify, at the ICN-GW, the ICN message to produce a modified ICN message; and
   encode, at the ICN-GW, the modified ICN message to route the modified ICN message to a data network (DN).

8. The non-transitory computer-readable storage medium of claim 7, wherein the computer-readable instructions are further configured to:
   receive the ICN message from the UE via the gNB and the ICN-PoA; and
   transmit the modified ICN message to the data network.

9. The non-transitory computer-readable storage medium of claim 7, wherein the ICN-GW is a data plane entity configured to interface with the DN to modify ICN messages entering or leaving the 5G cellular network having ICN.

10. The non-transitory computer-readable storage medium of claim 9, wherein the ICN messages include one or both of ICN packets and ICN context information.

11. The non-transitory computer-readable storage medium of claim 7, wherein the ICN-PoA is a data plane entity configured to serve as a first point of contact for ICN messages received from the UE.

12. The non-transitory computer-readable storage medium of claim 11, wherein the ICN messages include one or both of ICN packets and ICN context information.

13. A method of an Information Centric Networking gateway (ICN-GW) operable to modify an ICN message received from a user equipment (UE) in a Fifth Generation (5G) cellular network, the method comprising:

encoding aggregated ICN activity information for transmission to an Information Centric Networking control function (ICN-CF);

decoding an ICN information response received from the ICN-CE;

decoding, at the ICN-GW in the 5G cellular network, the ICN message received from the UE via a Next Generation NodeB (gNB) and an ICN point of attachment (ICN-PoA);

modifying, at the ICN-GW, the ICN message to produce a modified ICN message; and encoding, at the ICN-GW, the modified ICN message to route the modified ICN message to a data network (DN).

14. The method of claim 13, further comprising:

receiving the ICN message from the UE via the gNB and the ICN-PoA; and transmitting the modified ICN message to the data network.

15. The method of claim 13, wherein the ICN-GW is a data plane entity configured to interface with the DN to modify ICN messages entering or leaving the 5G cellular network having ICN.

16. The method of claim 15, wherein the ICN messages include one or both of ICN packets and ICN context information.

17. The method of claim 13, wherein the ICN-PoA is a data plane entity configured to serve as a first point of contact for ICN messages received from the UE.

* * * * *